United States Patent Office 2,730,133
Patented Jan. 10, 1956

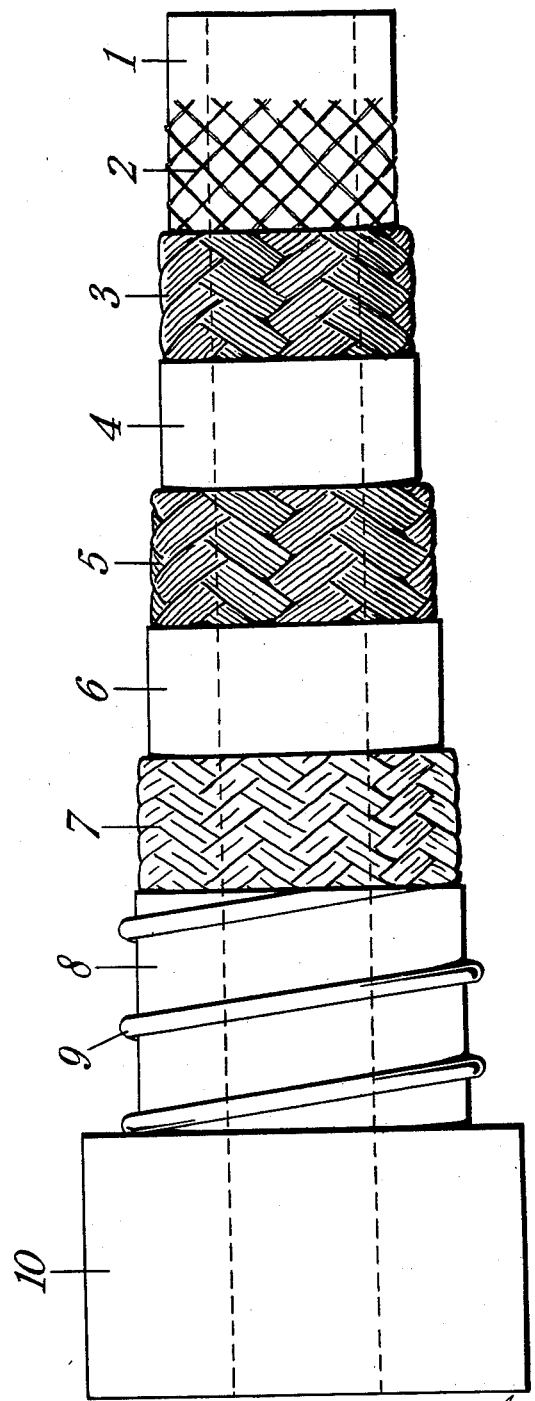

2,730,133

REINFORCED FIREPROOF HOSE

Wilfrid Holland-Bowyer, Sale, and James Henry Woodward, Manchester, England, assignors to Dunlop Rubber Company Limited, London, England, a British company Application February 2, 1952, Serial No. 269,656

Claims priority, application Great Britain February 2, 1951

4 Claims. (Cl. 138—56)

This invention relates to wire-braided fireproof hose and more particularly to wire-braided fireproof hose suitable for conducting highly inflammable liquids e. g. oils or other liquid fuels.

According to the invention a fireproof hose comprises a lining tube of rubber, an inner reinforcement of tubular wire-braiding thereover, an outer metal reinforcement and tubular asbestos-braiding interposed between the inner and outer metal reinforcements.

In the preferred construction the hose comprises an inner tube of natural or synthetic rubber surrounded by at least two wire braids and asbestos braid in that order, each braid layer being separated from the next by a layer of fire-resistant rubber, e. g. neoprene, and impregnated with a solution of such rubber. The outermost braid layer is covered by a layer of fire-resistant rubber, around which is tightly wound a helix of wire of high tensile strength, and this is encased in a covering of fire resistant rubber.

The lining tube must be resistant to the liquid for which the hose is to be used and may be made from natural rubber or a synthetic rubber, e. g. an oil-resistant synthetic rubber such as butadiene-acrylonitrile copolymer. Preferably the hose is provided with a coating of neoprene or other fire-resistant rubber composition and it also comprises intermediate layers of such a rubber composition.

In one form of the invention a lining tube of synthetic rubber is provided with a covering of tubular cotton-braiding around which is a ply of synthetic rubber in which is embedded a tubular, wire braid of high tensile strength; surrounding the wire braid is a tubular braiding of asbestos embedded in synthetic rubber and surrounding the asbestos braiding is a helical metal reinforcement made of a wire of high tensile strength which itself may be embedded in and covered with synthetic rubber. The wire of the helical reinforcement may be wound with an open pitch or with adjacent turns touching and the whole of the hose may be covered with a layer of a neoprene composition.

Instead of employing only one wire braid two or more such braids may be incorporated, each embedded in synthetic rubber. Surrounding the tubular braidings of wire there may be more than one tubular, asbestos braids.

Preferably all the synthetic rubber used in the above construction is neoprene rubber, with the exception of that for the lining tube, which as indicated above, will be chosen with regard to the liquid it is intended to convey in the hose.

In making a fireproof hose according to one embodiment of the invention a tube of a vulcanisable synthetic rubber composition of suitable thickness is extruded and around this tube a tubular braided covering of cotton is applied. The tubular cotton braiding may then be covered with a thin sheet or layer of a synthetic rubber composition which may be wound round the braid helically so that the successive turns overlap slightly. The thin sheet of rubber may be applied instead as a longitudinally extending tape, or it may be applied by extrusion. A tubular braiding of a high tensile strength steel wire of fine gauge, e. g. 30 to 33 S. W. G., is then applied over this rubber layer. If desired the layer of synthetic rubber next to the cotton braid may be omitted and the wire braid applied directly over the cotton braiding. The wire braiding is next covered with a thin layer of vulcanisable synthetic rubber composition, and over this synthetic rubber covering is applied a tubular braiding of spun asbestos yarn. The asbestos braiding is covered with a thin layer of vulcanisable synthetic rubber composition and around this layer is tightly wound a helix, preferably of open pitch, of high tensile wire, for example, steel, brass, copper, or Duralumin. The wire may, for example, be 18 S. W. G. steel wire of 80 to 90 tons per square inch tensile strength. Finally a covering of synthetic rubber is applied over the wire helix by extrusion. Each ply of braid is impregnated with natural or synthetic rubber solution to improve the adhesion between the braid and the succeeding layer of synthtic rubber. The hose is then heated to vulcanise the rubber in the various layers. The synthetic rubber composition used in building up the several plies or layers of the hose on the lining tube is preferably neoprene. As the result of the way in which the hose is built up the tubular braiding of high tensile strength steel wire is embedded in rubber formed by the layers applied before and after it.

It has been found that the use of the asbestos ply or plies in the form of tubular braiding is of great importance from the point of view of imparting fireproof qualities to the hose. For instance, in a flame test applied to samples containing respectively tubular asbestos braiding and asbestos cloth but otherwise of the same construction, those containing the tubular, asbestos braiding endured the flame for a considerably longer period before bursting than did those containing asbestos cloth.

One form of fireproof wire braided hose according to the invention is shown in the accompanying diagram.

In this diagram the hose has a lining tube 1 of natural rubber, over which is an open-work fine cotton braid 2. Two tubular braidings of high tensile strength steel wire 3 and 5 surround the braid 2, the two wire braidings being separated by an insulating layer 4 of neoprene, and a similar neoprene insulating layer 6 covers the braiding 5. Tubular asbestos braiding 7 is disposed around the neoprene insulating layer 6 and is itself covered by neoprene layer 8. Around the layer 8 is an open helix 9 of high tensile strength steel wire and the whole is enclosed in a neoprene covering 10.

This hose may be built up in the manner described above by applying over the lining tube in turn the various tubular braids and the sleeves of vulcanisable rubber compositions, the braids being impregnated with rubber solution, and the assembled construction being heated to effect vulcanisation of the rubber. The cottoon braid 2 becomes completely embedded in the lining tube 1 and the wire braid 3 is thus in effect embedded in the rubber of lining tube 1 and layer 4, and wire braid 3 is embedded in the rubber of layers 4 and 6.

Having described our invention, what we claim is:

1. A fire-resistant hose which comprises a lining tube of rubber, a rubber impregnated covering of textile fabric embedded in the outer surface of said lining tube, two coaxial spaced reinforcements of braided metal wire on said textile fabric, a tubular layer of rubber separating said reinforcements, a covering of rubber on said braided metal wire, a covering of braided asbestos on said covering of rubber, a metal helix enclosing said braided asbestos covering, a layer of fire-resistant rubber between said helix and said braided asbestos covering and an outer covering of synthetic rubber enclosing said wire helix.

2. A fire-resistant hose which comprises a lining tube of rubber, at least two co-axial spaced tubular reinforcements of braided metal wire covering said lining, a tubular layer of rubber separating said reinforcements, a cover of fire-resistant rubber on the outer surface of said braided metal wire reinforcement, a covering of braided asbestos on said covering of rubber, a wire helix enclosing said braided asbestos covering, a layer of fire-resistant rubber between said helix and said braided asbestos covering, and an outer covering of fire-resistant rubber enclosing the helix.

3. A fire-resistant hose in accordance with claim 2 wherein the wire of the helix is wound with an open pitch.

4. A fire-resistant hose in accordance with claim 2 wherein the fire-resistant rubber comprises neoprene.

References Cited in the file of this patent

UNITED STATES PATENTS

| | | |
|---|---|---|
| 630,599 | Douglas et al. | Aug. 8, 1899 |
| 945,686 | Bonner | Jan. 4, 1910 |
| 1,068,491 | Eynon | July 29, 1913 |
| 1,178,559 | Vautier | Apr. 11, 1916 |
| 1,726,957 | Hughes | Sept. 3, 1929 |
| 2,047,770 | Davis | July 14, 1936 |
| 2,173,359 | Freedlander | Sept. 19, 1939 |
| 2,393,496 | Stedman | Jan. 22, 1946 |
| 2,577,049 | Uline | Dec. 4, 1951 |

FOREIGN PATENTS

| | | |
|---|---|---|
| 617,025 | Great Britain | Jan. 31, 1949 |